US011294343B2

(12) United States Patent
Erpelding et al.

(10) Patent No.: US 11,294,343 B2
(45) Date of Patent: Apr. 5, 2022

(54) PREDICTIVE FREE COOLING

(71) Applicant: Optimum Energy, LLC, Seattle, WA (US)

(72) Inventors: Ben Erpelding, Seattle, WA (US); Ian Dempster, Seattle, WA (US); Peng Chen, Seattle, WA (US); Clark Matthys, Seattle, WA (US)

(73) Assignee: Optimum Energy, LLC, Seattle, WA (US)

( * ) Notice: Subject to any disclaimer, the term of this patent is extended or adjusted under 35 U.S.C. 154(b) by 0 days.

(21) Appl. No.: 15/405,194

(22) Filed: Jan. 12, 2017

(65) Prior Publication Data
US 2017/0198933 A1    Jul. 13, 2017

Related U.S. Application Data

(60) Provisional application No. 62/277,883, filed on Jan. 12, 2016.

(51) Int. Cl.
*G05B 19/042* (2006.01)
*F24F 11/62* (2018.01)
(Continued)

(52) U.S. Cl.
CPC .......... *G05B 19/0426* (2013.01); *F24F 11/30* (2018.01); *F24F 11/62* (2018.01);
(Continued)

(58) Field of Classification Search
CPC ......... G05B 19/0426; G05B 2219/2614; F24F 11/62; F24F 11/76; F24F 11/30; F24F 2011/0002; Y02B 30/542
See application file for complete search history.

(56) References Cited

U.S. PATENT DOCUMENTS

| 5,535,814 A | 7/1996 | Hartman |
| 5,605,280 A | 2/1997 | Hartman |

(Continued)

FOREIGN PATENT DOCUMENTS

| EP | 1279902 A2 | 1/2003 |
| JP | H0-8114347 A | 5/1996 |

(Continued)

OTHER PUBLICATIONS

International Search Report and Written Opinion for PCT Application No. PCT/US2017/013254, dated Apr. 4, 2017, 8 pages.

(Continued)

*Primary Examiner* — Nathan L Laughlin
(74) *Attorney, Agent, or Firm* — Seed IP Law Group, LLP

(57) ABSTRACT

An environmental control system for a building in a geographic location and having a heating, ventilation and air-conditioning (HVAC) system includes at least one computer-readable medium having instructions stored thereon that, when executed by at least one processing device in communication with the external application, enables the at least one processing device to receive weather data characterizing a weather forecast over a predetermined time period for the geographic location, receive free-cooling window data, determine, based on the weather data and free-cooling window data, an available free-cooling time window, and issue to the external application an executable command to the HVAC system to enter free-cooling mode during the available free-cooling time window.

19 Claims, 3 Drawing Sheets

(51) Int. Cl.
*F24F 11/76* (2018.01)
*F24F 11/30* (2018.01)
*F24F 11/00* (2018.01)
*F24F 140/60* (2018.01)
*F24F 130/10* (2018.01)
*F24F 110/12* (2018.01)
*F24F 11/65* (2018.01)
*F24F 110/10* (2018.01)
*F24F 11/46* (2018.01)
*F24F 130/00* (2018.01)
*F24F 11/64* (2018.01)

(52) U.S. Cl.
CPC .............. *F24F 11/76* (2018.01); *F24F 11/46* (2018.01); *F24F 11/64* (2018.01); *F24F 11/65* (2018.01); *F24F 2011/0002* (2013.01); *F24F 2110/10* (2018.01); *F24F 2110/12* (2018.01); *F24F 2130/00* (2018.01); *F24F 2130/10* (2018.01); *F24F 2140/60* (2018.01); *G05B 2219/2614* (2013.01); *Y02B 30/54* (2013.01)

(56) References Cited

U.S. PATENT DOCUMENTS

| | | | |
|---|---|---|---|
| 5,725,148 | A | 3/1998 | Hartman |
| 5,946,926 | A | 9/1999 | Hartman |
| 6,079,626 | A | 6/2000 | Hartman |
| 6,185,946 | B1 | 2/2001 | Hartman |
| 6,202,429 | B1 | 3/2001 | Kinkel et al. |
| 6,257,007 | B1 | 7/2001 | Hartman |
| 6,352,106 | B1 | 3/2002 | Hartman |
| 6,607,140 | B1 | 8/2003 | Hartman |
| 7,870,090 | B2 | 1/2011 | McCoy et al. |
| 8,543,244 | B2 | 9/2013 | Keeling et al. |
| 8,897,921 | B2 | 11/2014 | Dempster et al. |
| 9,476,657 | B1* | 10/2016 | Pettis ................. H05K 7/208 |
| 9,494,334 | B2* | 11/2016 | Sipe ................... F24F 11/006 |
| 10,180,261 | B1* | 1/2019 | Ross ................... F24F 11/30 |
| 2005/0040247 | A1 | 2/2005 | Pouchak |
| 2007/0005191 | A1 | 1/2007 | Sloup et al. |
| 2007/0055756 | A1 | 3/2007 | Richards et al. |
| 2007/0069850 | A1 | 3/2007 | Anderson, Jr. et al. |
| 2009/0065596 | A1 | 3/2009 | Seem et al. |
| 2009/0112369 | A1 | 4/2009 | Gwerder et al. |
| 2010/0198409 | A1 | 8/2010 | Hartman |
| 2011/0054698 | A1 | 3/2011 | Dempster et al. |
| 2011/0137468 | A1 | 6/2011 | Duncan |
| 2011/0153524 | A1 | 6/2011 | Schnackel |
| 2012/0232879 | A1 | 9/2012 | Iyengar et al. |
| 2013/0124003 | A1* | 5/2013 | Lehman .............. H05K 7/20836 |
| | | | 700/300 |
| 2013/0345882 | A1* | 12/2013 | Dushane ................ G05B 15/02 |
| | | | 700/276 |
| 2014/0148968 | A1 | 5/2014 | Chapman et al. |
| 2014/0277756 | A1 | 9/2014 | Bruce et al. |
| 2014/0277759 | A1 | 9/2014 | Sipe et al. |
| 2014/0316583 | A1* | 10/2014 | Ambriz .................... F24F 11/30 |
| | | | 700/277 |
| 2014/0372164 | A1 | 12/2014 | Egan et al. |
| 2015/0045982 | A1 | 2/2015 | Egan et al. |
| 2015/0127165 | A1 | 5/2015 | Quam et al. |
| 2015/0153109 | A1 | 6/2015 | Reytblat et al. |
| 2015/0293505 | A1 | 10/2015 | Gonzalez |
| 2015/0377509 | A1 | 12/2015 | Nicolai et al. |
| 2016/0305678 | A1 | 10/2016 | Pavlovski et al. |
| 2018/0039307 | A1* | 2/2018 | Hay ........................ G06F 1/20 |
| 2018/0252428 | A1* | 9/2018 | Malcolm ................. F24F 11/46 |

FOREIGN PATENT DOCUMENTS

| | | |
|---|---|---|
| JP | 2004-325033 A | 11/2004 |
| JP | 2008082641 A | 4/2008 |
| JP | 2008170131 A | 7/2008 |
| JP | 2012184864 A | 9/2012 |
| JP | 2012190442 A | 10/2012 |
| JP | 2013178097 A | 9/2013 |
| WO | 2014152276 A1 | 9/2014 |
| WO | 2015035241 A1 | 3/2015 |
| WO | 2016/013487 A1 | 1/2016 |

OTHER PUBLICATIONS

Pawlish, M. et al., "Free Cooling: A Paradigm Shift in Data Centers," Information and Automation for Sustainability; 347-352, 2010. [retrieved on Feb. 20, 2017]. Retrieved from the Internet. <URL: http://www.cs.montclair.edu/~greenit/papers/Sri%20Lanka.pdf>. entire document.
International Search Report and Written Opinion for PCT/US2018/013667, dated Apr. 4, 2018, 10 pages.
Extended European Search Report for European Application No. 17738973.1, dated Nov. 25, 2019, 5 pages.
Japanese Office Action, dated Feb. 9, 2021, for Japanese Application No. 2018-536852, 5 pages.
Extended European Search Report, dated Dec. 12, 2019, for European Application No. 17738973.1, 10 pages.
Extended European Search Report, dated Jan. 10, 2020, for European Application No. 18739049.7, 8 pages.
Office Action, dated Apr. 14, 2021, for Chinese Patent Application No. 201780012622.8. (3 pages) (with English Translation).

* cited by examiner

PREDICTIVE FREE COOLING

PRIORITY CLAIM

This application claims priority from U.S. Provisional Patent Application No. 62/277,883 filed Jan. 12, 2016, the contents of which are hereby incorporated by reference as if fully set forth herein.

BACKGROUND

Controlling the energy consumption of a building, and in particular the energy consumption of an HVAC system, has been achieved through a building automation system (BAS) having software executable algorithms that incorporate numerical constant values corresponding to equipment operating characteristics. FIG. 1 shows a BAS interacting with an HVAC system in which real-time operating conditions within the HVAC system are sent to the BAS while control settings are received.

The equipment of the HVAC system may include, but is not limited to, chillers, pumps, condensers, boilers, air handlers, heaters, terminal units, etc. The values utilized by the BAS are typically programmed during installation of the HVAC system and set according to the local climate and ambient conditions. These values may be changed periodically by manually evaluating and re-programming the BAS for anticipated changes in the local climate and tenant comfort complaints.

HVAC systems in the past had been designed and installed without energy efficiency in mind. With rising energy costs and more emphasis on protecting the environment, customers are now looking to reduce energy consumption. Other inventions that deal with energy efficiency within HVAC systems take a long time to implement, require large upfront costs, require a large amount of hardware modifications to the original BAS or HVAC system, and require expertise for installation, maintenance, updates, and even customer usage. These conventional systems may require frequent updates and repairs. Customers often need extensive training to perform such updates and repairs themselves. Typically, these systems may also require unique modifications for each different HVAC system, which adds to the cost and complexity of each installation. Further, conventional BASs are generally resource limited in their ability with respect to processing, exchanging and computing data.

Free cooling is an economic method of using low external air temperatures to assist in chilling water, which can then be used for industrial process, or air conditioning systems in green data centers. When the ambient air temperature drops to a set temperature, a modulating valve allows all or part of the chilled water to by-pass an existing chiller and run through the free-cooling system, which uses less power and uses the lower ambient air temperature to cool the water in the system without compromising cooling requirements.

Free cooling (water-side economizing) is an effective tool for reducing overall energy consumption in complex cooling systems. In practice, however, it can be difficult to implement effectively, and often involves guesswork in determining when to turn on and off.

Due to lack of precise information, operators tend to avoid using free cooling to minimize the possibility of expending the extra energy consumed by suddenly restarting chillers. When free cooling is used, it is often inefficiently implemented and fans are overrun—again, due to lack of precise data.

DESCRIPTION OF THE DRAWING FIGURES

Preferred and alternative embodiments of the present invention are described in detail below with reference to the following drawings.

DETAILED DESCRIPTION

Figure 1:
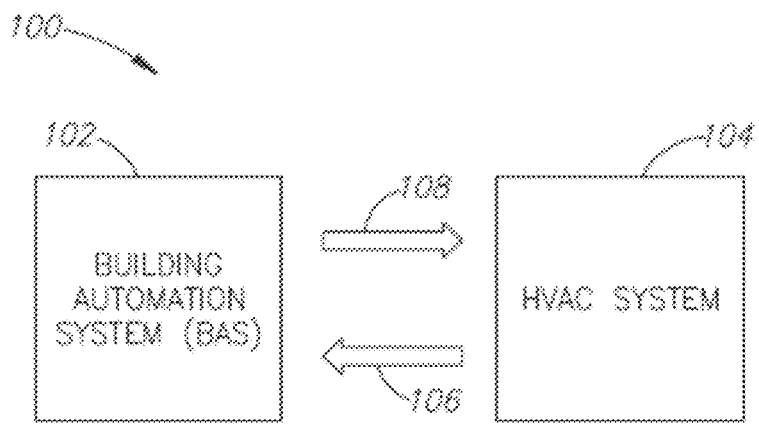
FIG. 1 is a schematic diagram of a building automation system interacting with an HVAC system without an external application according to a conventional environmental control system.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

In the following description, certain specific details are set forth in order to provide a thorough understanding of various embodiments of the invention. However, one skilled in the art will understand that the invention may be practiced without these details. In other instances, well-known structures associated with HVAC systems and individual HVAC components, building climate or environmental control systems, building automation systems (BASs) and various climate control or environmental control processes, parameters, and operations thereof have not necessarily been shown or described in detail to avoid unnecessarily obscuring descriptions of the embodiments of the invention.

An embodiment separates energy optimization computation from equipment control functions by externally interacting with the BAS of an HVAC system. In one embodiment, an optimization module, such as an external application, is located in a global control device, but could be housed in another hardware device that includes an internal microprocessor. The external application communications with the BAS, which in turn communicates with the HVAC system. The external application runs software subroutines or modules that process real-time HVAC system data and then provides that data to be read by the BAS, which in turn provides instructions to direct various HVAC system components to new or desired set points (e.g., a new temperature setting for a region of the building, a new flow rate for a pump or fan, etc.). One particular embodiment of the external application includes a method for optimizing or at attempting to optimize the overall energy efficiency of the HVAC system by reading, processing and revising various parameters, data, and set points.

In one embodiment, the HVAC system may include chiller plant equipment that is under the control of the BAS. Some of the BAS' responsibilities include equipment control functions: lead/lag changeover, equipment failure monitoring, equipment startup, equipment shutdown, alarms recognition and announcement, and failure changeover sequences of the chiller plant.

Free cooling can be used to save energy whenever the wet bulb temperature on the exterior of the chiller plant drops below the required chilled water set point. Such energy savings can be realized due to, for example, reduced dehumidification load for ventilation air and increased efficiency of cooling towers. An embodiment provides predictive free-cooling functionality. Predictive free cooling allows the use of a weather forecast (e.g., data received over a network and/or manually input, describing predicted ambient air temperatures over a predetermined and/or selectable time interval and external to a structure to be cooled) as an input to determine if free cooling should be requested or automatically implemented.

An embodiment incorporates weather forecast data that accurately predicts free-cooling availability based on outside air wet bulb threshold. When the ambient outside temperature is below the threshold for the minimum free-cooling window period, and current plant conditions permit free-cooling operation, an embodiment can inform an operator that free cooling is available. This process can also occur automatically, with an embodiment enabling and/or disabling free-cooling mode without operator intervention. Predictive free cooling is configurable, allowing for both the outside air wet bulb threshold and the minimum free-cooling window period to be adjusted based on a site's specific requirements. An embodiment may generate monthly reports that give insight into the free-cooling hours available, free-cooling hours activated, and free-cooling hours missed when otherwise available.

Predictive free cooling adds the ability to ensure that a window of weather availability is present; without it, only current conditions may be used. By providing this precise weather-condition data ahead of time, the possibility of inefficiently expending energy by shutting down and restarting chillers is minimized. In other words, chillers may be only shut down if ambient air-temperature conditions will, according to the weather forecast, persist long enough to create free-cooling energy savings exceeding the energy required to restart the chillers. This latter determination can typically be a function of the specific tonnage, flow rate, and/or current wet-bulb temperature set point (collectively "free-cooling window data") associated with the chillers in question.

The result is reduced overall energy consumption through increased use of free cooling and improved efficiency in system operations. By leveraging the real-time operating data in an embodiment, the system learns and improves over time, allowing operators to use free cooling more often, and at optimal efficiency.

FIG. 1 is provided for purposes of clarity to illustrate an environmental control system 100 that includes interaction between a building automation system (BAS) 102 and an HVAC system 104. The system 100 does not include an external application, so it is therefore consistent with existing or conventional environmental control systems. In operation, real-time operating conditions 106 within the HVAC system 104 are transmitted to the BAS 102 and then control settings 108, also called set points, are controllably transmitted from the BAS 102 to the HVAC system 104. In this system, equipment control functions and optimization functions must be co-mingled in the BAS.

Figure 2:
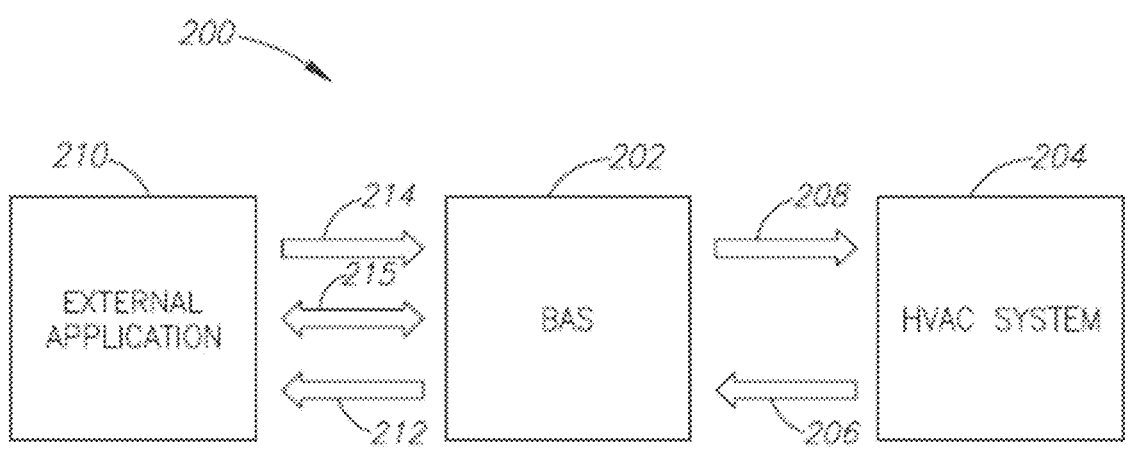
FIG. 2 is a schematic diagram of an environmental control system having an external application in communication with a building automation system to control energy consumption of an HVAC system according to an embodiment of the present invention.

FIG. 2 shows an environmental control system 200 that includes interaction between a BAS 202 and an HVAC system 204 in which real-time operating data 206 within the HVAC system 204 are transmitted to the BAS 202 as described above. The real-time operating data 206 may include equipment operating conditions such as, but not limited to, voltages, speeds, temperatures and pressures, hereinafter referred to as "real-time operating data". In addition, the environmental control system 200 includes an external application 210 configured to communicate with the BAS 202 through a data communication network (not shown). In one embodiment, the interaction between the external application 210 and the BAS 202 is accomplished with a logical interface that allows the external application 210 to interact remotely from the BAS 202 and optionally interact with other BASs. The external application 210 provides application data 214 to the BAS 202. The application data 214 may include operating parameters for the HVAC system 204, for example the application data 214 may indicate which HVAC components should be currently running, at what speeds, etc. Direct (e.g., hardware level) control of HVAC equipment is provided by the BAS 202. The application data 214 provided to the BAS 202 from the external application 210 may preferably include data to vary equipment speeds and define new equipment set points, but additional data may also be provided.

The BAS 202 reads the real-time operating data 206 from the HVAC system 204. The external application 210 interacts with the BAS 202 to achieve energy savings for the HVAC system 204 by receiving equipment data 212 from the BAS 202 and then processing the equipment data 212 using software algorithms that calculate or otherwise determine desired operating settings for the HVAC system 204. To achieve the desired operating settings, the application data 214 is sent from the external application 210 to the BAS 202, which in turn permits the BAS 202 to operate the HVAC system 204 in accordance with the application data 214 provided from the external application 210. By way of example, the BAS 202 operates the HVAC system 204 with controlling instructions 208. In one embodiment, the external application 210 includes a programmable microprocessor unit.

The external application 210 uses three types of data, the equipment data 212, the application data 214, and status data 215 when interacting with the BAS 202. The equipment data 212 includes the real-time operating data 206 as originally provided by the HVAC system 204 and interpretively modified by the BAS 202. The equipment data 212 may take the form of data related to power consumption, equipment speed, supply temperatures, equipment set points, equipment faults, running statuses, etc. The BAS 202 writes the equipment data 212 to the external application 210. The application data 214 includes operating parameters processed by the external application 210 and read by the BAS 202. The application data 214 may then be acted upon within desired operational and/or safety limits defined by the HVAC system 204. The application data 214 may include optimized set points, optimized speed set points, temperature set points, etc. In a preferred embodiment, the equipment data 212 is sent to the external application 210 while the application data 214 is provided by the external application 210. The status data 215 is exchanged between the BAS 202 and the external application 210 so that each has access to the current status of the other. Existing BASs do not have the necessary control logic or computing power to perform like the external application 210, which includes more complex control logic and may require more computing power.

Figure 3:
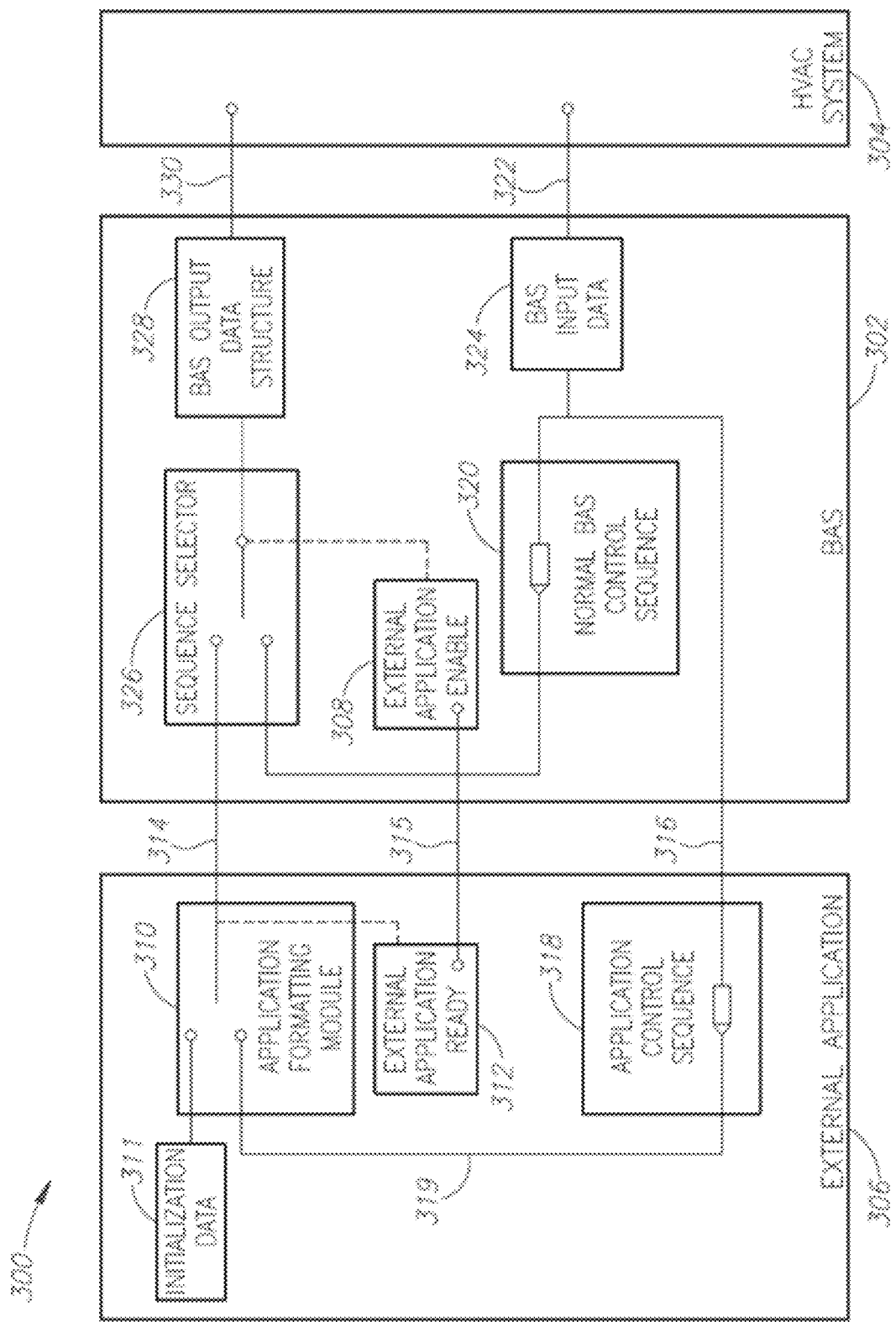
FIG. 3 is a block logic diagram of the communications and operation of the environment control system of FIG. 2 according to an embodiment of the present invention.
Figure 4:
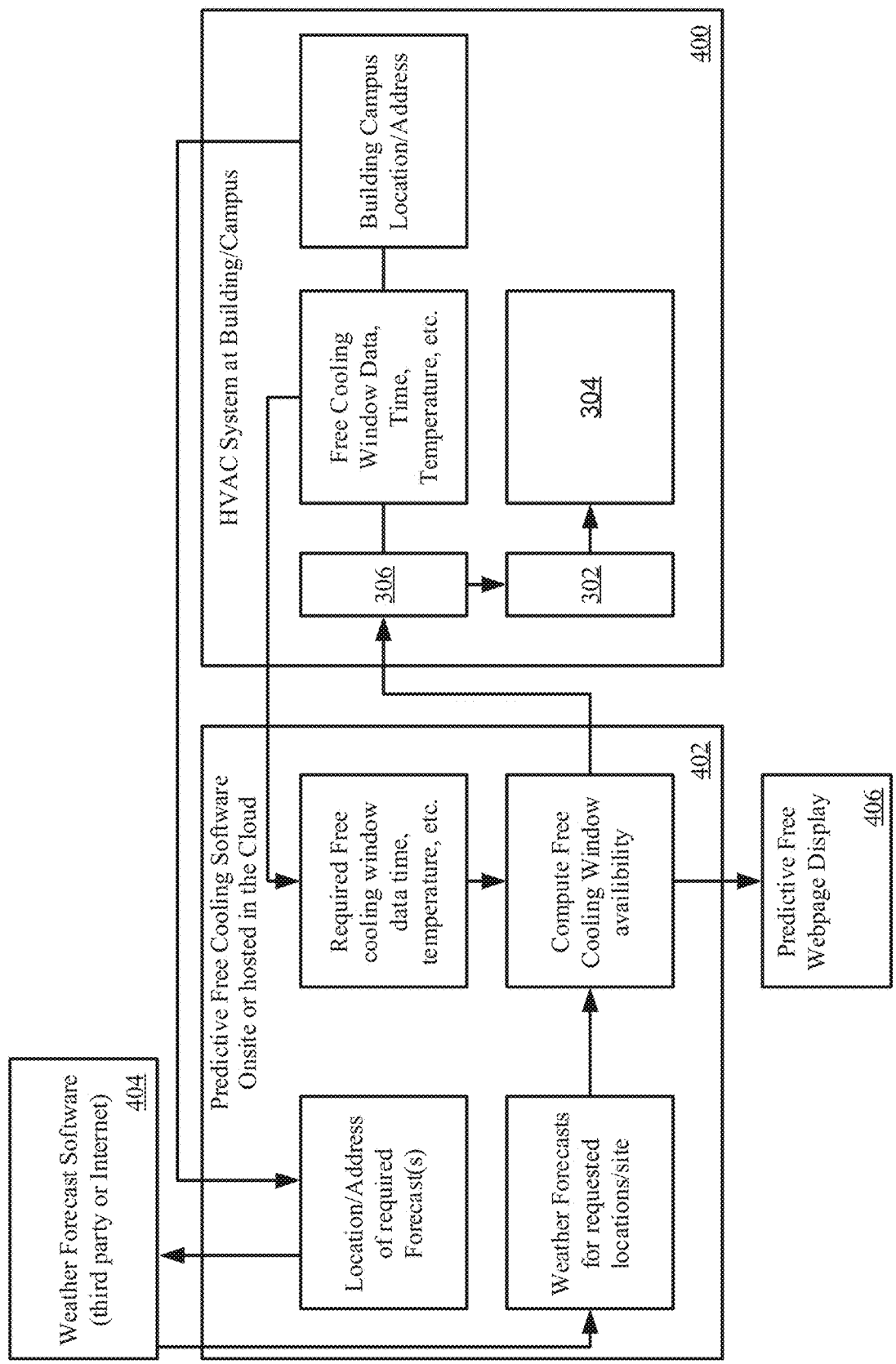
FIG. 4 is a block logic diagram of the communications and operation of free-cooling functionality in connection with the environment control system of FIG. 3 according to an embodiment of the present invention.

FIG. 3 shows a logic diagram of an environmental control system 300 for a building or other structure 400 (FIG. 4). The control system 300 includes a BAS 302, and HVAC system 304 and an external application 306.

The BAS 302 reads real-time operating data 322 from the HVAC system 304 and converts the data 322 into BAS input database 324. The BAS input database 324 is directed to both a normal BAS control sequence 320 and equipment data 316, which may take the form of the equipment data described above.

The default BAS control sequence 320 is used to directly control the HVAC system 304 without the external application 306 or when the external application 306 is in a non-operational or non-communicative mode. The sequence 320 is the original control logic sequence that controlled the HVAC system 304 prior to integration of the external application 306 with the BAS 302. Although the sequence 320 may operate the HVAC system 304 in a stable manner, which may include, but is not limited to, a steady state operating configuration, it is appreciated that the sequence 320 may not optimize the efficiency of the HVAC system 304.

The equipment data 316 is utilized by an equipment application control sequence 318 of the external application 306 to process the equipment data 316 and determine desired application settings 319. The desired application settings 319 are formatted by the application formatting module 310 to become application data 314. The application formatting module 310 is triggered based on a signal or data received from an external application ready 312.

By way of example, the external application ready 312 (hereinafter the ready 312) informs the application formatting module 310 whether the external application 306 meets certain criteria such that the ready 312 may then allow the application formatting module 310 to format the desired application settings 319 to the application data 314. The go-ahead criteria for the ready may require that each of the following are met, specifically that (1) the external application is in an operational mode; (2) the external application is in a communications mode with the BAS 302; (3) the BAS is operational; and (4) the BAS 302 expects to receive instructions from the external application 306 to operate.

If the ready 312 determines that the external application 306 is not operational, there is no communication with the BAS 302, or that the BAS 302 does not require the external application 306 to operate, then the ready 312 informs the application formatting module 310 to format the initialization data 311 to application data 314. Thus, the ready 312 determines whether the external application 306 is operational through internal status checks. The ready 312 determines communication with the BAS 302 via the status data 315 and rechecks this status periodically. The ready 312 determines that the BAS 302 requires the external application 306 to operate via the status data 315, which includes a signal from the external application enable 308.

The initialization data 311 may include application settings for operating the HVAC system at a minimum stable level if the application data 314 is utilized by the BAS. The initialization data 311 may be utilized until the external application 306 is ready, until communications between the external application 306 and the BAS 302 are restored, until the BAS 302 expects to receive the application data 314 from the external application 306 to operate, or any combination of the foregoing.

The BAS 302 receives the application data 314 from the external application 306. A sequence selector 326 then determines which of the data sequences (the application data 314 or the normal BAS control sequence 320) to send to a BAS output data structure 328. The sequence selector 326 determines which of the data signals to send, via the external application enable 308. In one embodiment, the external application enable 308 includes an operator defined enable point that permits the operator to manually trigger the control system 300 to indicate that the BAS 302 will be using the external application 306 to operate the HVAC system 304.

If the external application enable 308 informs the sequence selector 326 that the operator defined enable point is enabled, the communication with the external application 306 is operational, and the external application 306 is ready to operate, then the enable 308 it will allow the sequence selector 326 to send the application data 314 to the BAS output data structure 328.

If the external application enable 308 determines that the operator defined enable point is disabled, the external application 306 is not operational, there is no communication with the external application 306, or some combination thereof, then the enable 308 informs the sequence selector 326 to send the normal BAS control sequence 320 to the BAS output data structure 328 as contrasted to sending the application data 314. The BAS output data structure 328 may then convert the received data to control instructions 330, which are then received by the HVAC system 304.

Still referring to FIG. 3, one example of an environment control system includes the external application 306 interacting with the BAS 302 to control a chiller plant (e.g., HVAC system 304). In the BAS 302, an external application enable value within the BAS 302 directs the external application enable 308 that there is a demand for optimized cooling within a building, therefore the enable value is set to TRUE. Next, the external application 306 is instructed that the application data 314 is needed from the external application 306 as processed by the application control sequence 318. The application data 314 may then be processed by the sequence selector 326 and converted to data received by the BAS output data structure 328, which may then be transmitted to the chiller plant 304 as controlling instructions 330 intended to provide an improved optimization sequence to increase an overall operating efficiency of the chiller plant.

When the external application enable value is FALSE, this indicates to the external application 306 that the chiller plant 304 is set to be operated under manual or BAS control, which does not require the processed application data 314 from the external application 306. In such a configuration, the initialization data 311 or other default data accessible by the sequence selector 326 may be processed and transmitted to the BAS output data structure 328, which in turn provides the controlling instructions 330 to the chiller plant 304.

Once the chiller plant is operating at desired efficiency, which may be checked or otherwise verified using the external application, the external application 306 may analyze and determine a required chiller operating parameter within the application control sequence 318 and then transmit processed application data 314 to the BAS 302, which in turn provides controlling instructions 330 to operate the chiller to the desired efficiency or another efficiency as determined by the external application 306. Similarly, after receiving the real-time operating data 322 and converting the same to the equipment data 316, the external application 306 may determine a new chilled water temperature set point. The external application 306 sends the new chilled water temperature set point to the BAS 302 via the application data 314. It is appreciated that the aforementioned data flow may be utilized to provide controlling instructions 330 to other components besides a chiller, for example a boiler, a fan, air handling units, variable air volume units, or any other component of the HVAC system.

In the event there is a loss of communication between the external application 306 and the BAS 302, the BAS 302 may retain the last supplied application data 314 for a desired period of time. After this desired period of time, the BAS 302 may return to the normal BAS control sequence 320 until communication is restored. After communication has been restored and after some additional period of time, the external application 306 may again be brought online to generate new application data 314. The BAS 302 may be configured to smoothly make the transition from the normal BAS control sequence 320 to utilizing the application data 314 in a gradual and efficient manner.

Referring now to FIG. 4, an embodiment includes a predictive free cooling module 402. The module 402 receives free-cooling window data and the location of building 400 from the external application 306. Module 402 passes the location of building 400 to a weather forecast engine 404. Forecast engine 404 may be provided by a third-party weather service such as, for example, the NOAA. Forecast engine 404 returns a weather forecast over a predetermined period of time for the location of building 400. Alternatively, the weather forecast is provided by module 402, itself using weather sensors to which the module is interfaced.

Module 402 determines free-cooling window availability data based on the weather forecast received from engine 404 and the free-cooling window data. In an embodiment, the weather forecast form engine 404 provides a prediction of drybulb temperature (regular temperature), relative humidity, barometric pressure, and wetbulb temperature for a period into the future (e.g., between 24 hours to 72 hrs).

The free-cooling weather data may consist of, wetbulb temperature threshold (may be configurable by installation, typically between 32 degrees F. and 50 degrees F.), drybulb temperature threshold (may be configurable by installation, typically between 32 degrees F. and 50 degrees F.), free-cooling window (may be configurable by installation, typically between 1-24 hrs).

Module 402 applies the free-cooling data such as wetbulb threshold (or drybulb threshold; either or both may be used) and free-cooling window to the predicted weather data, determines if the predicted wetbulb temperature (or drybulb threshold; either one or both may be used in parallel) is below the associated threshold temperature for a period of consecutive time, if this amount of consecutive time meets or exceeds the free-cooling window period, then a "free-cooling window" is determined to be available, if the amount of consecutive time does not equal or exceed the free-cooling window period, then a "free-cooling window" is not determined to be available.

For example: wetbulb temperature threshold=35 degrees F., drybulb temperature threshold=40 degrees F., free-cooling window period=4 hrs. if the predicted weather data shows that at 1:00 am the wetbulb temperature will be 35.2 degrees F. and the drybulb temperature will be 40.1 degrees F. a "free-cooling window" is determined NOT to be available. Until, at 2:00 am the wetbulb temperature will be 34.8 degrees F. and the drybulb temperature will be 38 degrees F., the wetbulb temperature and the drybulb temperature remain below their respective thresholds till 7:32 am, when the wetbulb temperature will be 35.4 degrees F. and the drybulb temperature will be 40.3 degrees F., this period exceeds the free-cooling window period of 4 hrs, so a "free-cooling window" is determined to be available starting at 2:00 am, ending at 7:32 am.

Module 402 passes the free-cooling window availability data to the external application 306 and, if free-cooling conditions are met, can instruct the external application to switch chiller plant 304 to free-cooling mode in which the chillers are disabled or brought to a low-power state, and the cooling fluid (e.g., water) routed to conduits exposed to ambient temperatures. Upon the free-cooling window's closing, module 402 can further instruct the external application 306 to switch chiller plant 304 out of free-cooling mode, thereby restarting the chillers.

The free-cooling window availability data may be displayed to a user via a webpage 406. This displayed data provided by module 402 may further include information describing the extent to which the chiller plant 304 has historically operated in free-cooling mode during identified free-cooling windows, as well as other performance indicators, such as time spent by the chiller plant in free-cooling mode, number of available free-cooling windows in a predetermined historical time range, and average length of free-cooling windows.

This data is also displayed to the operator or customer through an intuitive dashboard view.

The Dashboard displays:

Free Cooling Window Availability Status

If Free Cooling Window is available, display "Free Cooling Available" in green

If Free Cooling Window is not available, display "Free Cooling Not Available" in grey State Weather Data Status If file is stale (no forecast data for 24 hours. display "Free cooling not available, Weather forecast our of date"

If file is not state, display nothing.

Free Cooling Status

If Free Cooling Available=YES and Free Cooling Status=ON; display "Free cooling is on" in grey If Free Cooling Available=YES and Free Cooling Status=OFF; display "Free cooling is off" in red If Free Cooling Available=NO and Free Cooling Status=OFF; display "Free cooling is off" in grey If Free Cooling Available=NO and Free Cooling Status=YES; display "Free cooling is off" in red Wet Bulb Temperature Display wet bulb threshold (this will be a trended point)

Display current OAWB

Free Cooling Window Duration

Required window is the minimum amount of time the forecast wet bulb must be below the threshold to have free cooling available Display Required Minimum Window (this will be a trended point)

Display time remaining

If there is a current window, display the time remaining in the window

If there is not a current window, display "no current window"

If the weather data is stale, display "unknown"

If the current free cooling window is more than 72 in the future, display "more than 72 hours"

Free Cooling Window Availability

Current Window Began:

If there is an active free cooling window (irrespective of stale weather data status), display the window start date and time If there not a current window (irrespective of stale weather data status), display "no current window"

Next Window Available:

If weather data is stale, display "unknown"

If there is a free cooling window available in the next 72 hours (that is not the current window), display window start date and time If the current free cooling window is more than 72 in the future, display "more than 72 hours"

In an embodiment, the external application 306 continually or periodically provides updated free-cooling window data to module 402. This information provided by external application 306 enables module 402 to calculate updated free-cooling windows as such information (e.g., required load) changes over time.

Additionally, and in an embodiment, the external application 306 continually or periodically informs module 402 of whether chiller plant 304 is operating in free-cooling mode. This information provided by external application 306 enables module 402 to calculate the extent to which chiller plant 304 effectively exploited all portions of available free-cooling windows.

The various embodiments described above can be combined to provide further embodiments. All of the above U.S. patents, patent applications and publications referred to in this specification, as well as U.S. Pat. No. 6,185,946, are incorporated herein by reference in their entireties. Aspects can be modified, if necessary, to employ devices, features, methods and concepts of the various patents, applications and publications to provide yet further embodiments.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An environmental control system for a building in a geographic location, the system comprising:
    a controllable heating, ventilation and air-conditioning (HVAC) system configured to change environmental aspects of the building to target parameters;
    a building automation system in communication with the HVAC system and configured to adjustably control at least one of the target parameters to a desired value;
    a control device external to the building automation system and HVAC system, the control device executing an application in communication with the building automation system and configured to evaluate equipment data received from the building automation system, the equipment data including at least one or more of: equipment fault data or equipment running status data, and to then process the equipment data to generate application data using an application control sequence, wherein generating the application data includes determining operating settings for the HVAC system based on the equipment data, the application providing the application data to the building automation system for controlling the HVAC system to achieve the desired value of the at least one of the target parameters; and
    at least one computer-readable medium external to the building automation system and HVAC system having instructions stored thereon that, when executed by at least one processing device in communication with the building automation system, enables the at least one processing device to:
        receive weather data characterizing a weather forecast over a predetermined time period for the geographic location;
        receive free-cooling window data;
        determine, based on the weather data and free-cooling window data, an available free-cooling time window;
        determine, based on the equipment data and the free-cooling window data, a transition energy cost for transitioning between a free-cooling mode and a non-free-cooling mode;
        determine, based on the equipment data and the available free-cooling time window, an energy savings for operating in the free-cooling mode;
        determine, based on the transition energy cost and the energy savings for operating in the free-cooling mode, whether the transition energy cost exceeds the energy savings;
        responsive to a determination that the transition energy cost does not exceed the energy savings, provide the available free-cooling time window to the application;
        obtain current weather data characterizing the current weather conditions at the time of the available free-cooling time window; and
        determine, based on the current weather data, whether the HVAC system is capable of operating in the free-cooling mode to achieve the desired value at the time of the available free-cooling time window.

2. The system of claim 1, wherein the application is further configured to operate the HVAC system in an optimized, energy-efficient manner.

3. The system of claim 1, wherein the building automation system is further configured to return to a default sequence of operations during a communication failure.

4. The system of claim 1, wherein the equipment data includes real-time operating data originally provided by the HVAC system to the building automation system.

5. The system of claim 1, wherein the application data includes operating parameters read from the application by the building automation system.

6. The system of claim 5, wherein the operating parameters includes operating limits obtained from the HVAC system.

7. The system of claim 5, wherein the operating parameters include safety limits associated with the HVAC system.

8. The system of claim 1, wherein the free-cooling window data comprises a threshold wet-bulb temperature value for ambient air in the geographic location.

9. The system of claim 1, wherein the free-cooling window data comprises a numerical value representing a minimum free-cooling window time period.

10. An environmental control system for a building in a geographic location and having a heating, ventilation and air-conditioning (HVAC) system controllably configured to change environmental aspects of the building to target parameters, a building automation system in communication with the HVAC system and configured to adjustably control at least one of the target parameters to a desired value, the system comprising:
a control device external to the building automation system and HVAC system, the control device executing an application in communication with the building automation system and configured to evaluate equipment data received from the building automation system, the equipment data including at least one or more of: equipment fault data or equipment running status data, and to then process the equipment data to generate application data using an application control sequence, wherein generating the application data includes determining operating settings for the HVAC system based on the equipment data, the application providing the application data to the building automation system for controlling the HVAC system to achieve the desired value of the at least one of the target parameters; and
at least one computer-readable medium having instructions stored thereon that, when executed by at least one processing device in communication with the application, enables the at least one processing device to:
receive weather data characterizing a weather forecast over a predetermined time period for the geographic location;
receive free-cooling window data;
determine, based on the weather data and free-cooling window data, an available free-cooling time window;
determine, based on the equipment data and the free-cooling window data, a transition energy cost for transitioning between a free-cooling mode and a non-free-cooling mode;
determine, based on the equipment data and the available free-cooling time window, an energy savings for operating in the free-cooling mode;
determine, based on the transition energy cost and the energy savings for operating in the free-cooling mode, whether the transition energy cost exceeds the energy savings;
responsive to a determination that the transition energy cost does not exceed the energy savings, issue to the application an executable command to the HVAC system to enter free-cooling mode during the available free-cooling time window;
obtain current weather data characterizing the current weather conditions at the time of the available free-cooling time window;
determine, based on the current weather data, whether the HVAC system can operate in the free-cooling mode at the time of the available free-cooling time window; and
responsive to a determination that the HVAC system is capable of operating in a free-cooling mode to achieve the desired value at the time of the available free-cooling window, issue to the application an executable command to the HVAC system to enter free-cooling mode during the available free-cooling time window.

11. The system of claim 10, wherein the application is further configured to operate the HVAC system in an optimized, energy-efficient manner.

12. The system of claim 10, wherein the building automation system is further configured to return to a default sequence of operations during a communication failure.

13. The system of claim 10, wherein the equipment data includes real-time operating data originally provided by the HVAC system to the building automation system.

14. The system of claim 10, wherein the application data includes operating parameters read from the application by the building automation system.

15. The system of claim 14, wherein the operating parameters includes operating limits obtained from the HVAC system.

16. The system of claim 14, wherein the operating parameters include safety limits associated with the HVAC system.

17. The system of claim 10, wherein the free-cooling window data comprises a threshold wet-bulb temperature value for ambient air in the geographic location.

18. The system of claim 10, wherein the free-cooling window data comprises a numerical value representing a minimum free-cooling window time period.

19. An environmental control system for a building in a geographic location, the system comprising:
a controllable heating, ventilation and air-conditioning (HVAC) system configured to change environmental aspects of the building to target parameters;
a building automation system in communication with the HVAC system and configured to adjustably control at least one of the target parameters to a desired value;
a control device external to the building automation system and HVAC system, the control device executing an application in communication with the building automation system and configured to evaluate equipment data received from the building automation system and to then process the equipment data to generate application data using an application control sequence, the application providing the application data to the building automation system for controlling the HVAC system to achieve the desired value of the at least one of the target parameters; and
at least one computer-readable medium external to the building automation system and HVAC system having instructions stored thereon that, when executed by at least one processing device in communication with the building automation system, enables the at least one processing device to:
receive weather data characterizing a weather forecast over a predetermined time period for the geographic location;

receive free-cooling window data, the free-cooling window data including at least one or more of: chiller tonnage data, chiller flow rate data, or wet-bulb temperature data;

determine, based on the equipment data and the free-cooling window data, a transition energy cost for transitioning between a free-cooling mode and a non-free-cooling mode;

determine, based on the weather data and the free-cooling window data, an available free-cooling time window;

determine, based on the equipment data and the available free-cooling time window, an energy savings for operating in the free-cooling mode;

determine, based on the transition energy cost and the energy savings for operating in the free-cooling mode, whether the transition energy cost exceeds the energy savings;

responsive to a determination that the transition energy cost does not exceed the energy savings, provide the available free-cooling time window to the application;

obtain current weather data characterizing the current weather conditions at the time of the available free-cooling time window; and determine, based on the current weather data, whether the HVAC system is capable of operating in the free-cooling mode to achieve the desired value at the time of the available free-cooling time window.

\* \* \* \* \*